United States Patent
He et al.

(10) Patent No.: US 12,430,320 B2
(45) Date of Patent: Sep. 30, 2025

(54) ADAPTIVE AUTO GARBAGE COLLECTOR IN MVCC DATABASE SYSTEM

(71) Applicant: Google LLC, Mountain View, CA (US)

(72) Inventors: Yingjie He, Cupertino, CA (US); James Frederick Mattly, San Jose, CA (US); Thorvald Natvig, Mountain View, CA (US)

(73) Assignee: Google LLC, Mountain View, CA (US)

( * ) Notice: Subject to any disclaimer, the term of this patent is extended or adjusted under 35 U.S.C. 154(b) by 237 days.

(21) Appl. No.: 18/313,270

(22) Filed: May 5, 2023

(65) Prior Publication Data

US 2024/0370426 A1 Nov. 7, 2024

(51) Int. Cl.
*G06F 16/23* (2019.01)

(52) U.S. Cl.
CPC ...... *G06F 16/2379* (2019.01); *G06F 16/2365* (2019.01)

(58) Field of Classification Search
None
See application file for complete search history.

(56) References Cited

U.S. PATENT DOCUMENTS

| | | | |
|---|---|---|---|
| 8,832,063 B1 * | 9/2014 | Dean | G06F 16/90335 707/707 |
| 10,558,628 B2 * | 2/2020 | Dietterich | G06F 12/0269 |
| 11,018,991 B1 | 5/2021 | Vishwakarma et al. | |
| 2004/0225820 A1 * | 11/2004 | Adkisson | G06F 13/405 710/306 |
| 2018/0331971 A1 * | 11/2018 | Certain | H04L 47/70 |
| 2019/0018742 A1 | 1/2019 | Thomsen et al. | |
| 2021/0073121 A1 | 3/2021 | He et al. | |

FOREIGN PATENT DOCUMENTS

WO 2022266889 A1 12/2022

OTHER PUBLICATIONS

"SAP HANA Troubleshooting and Performance Analysis Guide", Oct. 31, 2019, 298 pp.
Cramer, "Transaction ID Wraparound in Postgres", Product Blog—Sentry, Jul. 23, 2015, 14 pp.

* cited by examiner

*Primary Examiner* — Amresh Singh
(74) *Attorney, Agent, or Firm* — Shumaker & Sieffert, P.A.

(57) ABSTRACT

A method includes obtaining a query to perform an operation on a tuple of a plurality of tuples stored at a database. Each respective tuple assigned a respective transaction identifier (ID) from a set of transaction IDs. The set of transaction IDs includes a subset of unavailable transaction IDs each currently assigned to one of the tuples and a subset of available transaction IDs each currently unassigned to any tuple. The method also includes assigning one of the available transaction IDs to the tuple based on the query and determining an oldest transaction ID age from the set of transaction IDs. The method also includes determining that the oldest transaction ID age satisfies a threshold and performing a garbage collection process on the database based on determining that the oldest transaction ID age satisfies the threshold.

22 Claims, 7 Drawing Sheets

ADAPTIVE AUTO GARBAGE COLLECTOR IN MVCC DATABASE SYSTEM

TECHNICAL FIELD

This disclosure relates to adaptive auto garbage collector in MVCC system.

BACKGROUND

Database systems store structured data, for example tables, allowing database users to perform data operations on the stored tables. In response to performing each data operation, the database systems assign an identifier from a finite number of identifiers to the data associated with the data operation. Over time, the database systems accumulate a significant amount of unused data thereby resulting in table bloat. Moreover, the accumulation of unused data causes operation performance at the database systems to degrade and an exhaustion of the finite number of identifiers. Some database systems reclaim the unused data space to reduce the accumulation of unused data. However, reclaiming unused data requires resource utilization from the database systems that could otherwise be utilized to perform data operations thereby causing increased latency for database users.

SUMMARY

One aspect of the disclosure provides a computer-implemented method that when executed on data processing hardware causes the data processing hardware to perform operations for performing adaptive garbage collection at a database. The operations include obtaining a query to perform an operation on a tuple of a plurality of tuples stored at a database. The database includes a plurality of computing resources configured to perform operations on the plurality of tuples. Each respective tuple of the plurality of tuples is assigned a respective transaction identifier (ID) from a set of transaction IDs. The set of transaction IDs includes a subset of unavailable transaction IDs each currently assigned to one of the tuples of the plurality of tuples and a subset of available transaction IDs each currently unassigned to any tuple of the plurality of tuples. The operations also include assigning one of the available transaction IDs from the subset of available transaction IDs to the tuple based on the query. The operations also include determining an oldest transaction ID age from the set of transaction IDs after assigning the one of the available transaction IDs to the tuple. The operations also include determining that the oldest transaction ID age satisfies a threshold and, in response, performing a garbage collection process on the database.

Implementations of the disclosure may include one or more of the following optional features. In some implementations, the garbage collection process includes obtaining usage information for the plurality of computing resources including available computing resources from the plurality of computing resources and unavailable computing resources from the plurality of computing resources, allocating the available computing resources for the garbage collection process based on the usage information, and executing the garbage collection process using the allocated available computing resources. The plurality of resources may be shared to perform the operations on the plurality of tuples and to perform the garbage collection process.

In some examples, the garbage collection process includes dynamically increasing a number of computing resources allocated for the garbage collection process based on the usage information and executing the garbage collection process using the increased number of computing resources allocated for the garbage collection process. The garbage collection process may include constraining a rate of assigning available transaction IDs. Optionally, the garbage collection process may include prohibiting any assignment of transaction IDs based on subsequently received queries. In some implementations, the plurality of computing resources are further configured to perform the garbage collection process.

Determining that the oldest transaction ID age satisfies the threshold may include determining that the oldest transaction ID age satisfies a respective threshold from among a plurality of thresholds. In some examples, each respective transaction ID in the set of transaction IDs includes a corresponding ID value. In these examples, determining the oldest transaction ID age from the set of transaction IDs may include determining a difference between the corresponding ID value of a subsequent available transaction ID after the one of the available transaction IDs and the corresponding ID value of an unavailable transaction ID having a lowest corresponding ID value. In some implementations, the operations further include identifying a respective one of the tuples of the plurality of tuples that includes a collection blocker preventing the garbage collection process from executing on the respective one of the tuples and generating a warning based on identifying the respective one of the tuples of the plurality of tuples that includes the collection blocker.

Another aspect of the disclosure provides a system that includes data processing hardware and memory hardware storing instructions that when executed on the data processing hardware causes the data processing hardware to perform operations. The operations include obtaining a query to perform an operation on a tuple of a plurality of tuples stored at a database. The database includes a plurality of computing resources configured to perform operations on the plurality of tuples. Each respective tuple of the plurality of tuples is assigned a respective transaction identifier (ID) from a set of transaction IDs. The set of transaction IDs includes a subset of unavailable transaction IDs each currently assigned to one of the tuples of the plurality of tuples and a subset of available transaction IDs each currently unassigned to any tuple of the plurality of tuples. The operations also include assigning one of the available transaction IDs from the subset of available transaction IDs to the tuple based on the query. The operations also include determining an oldest transaction ID age from the set of transaction IDs after assigning the one of the available transaction IDs to the tuple. The operations also include determining that the oldest transaction ID age satisfies a threshold and, in response, performing a garbage collection process on the database.

Implementations of the disclosure may include one or more of the following optional features. In some implementations, the garbage collection process includes obtaining usage information for the plurality of computing resources including available computing resources from the plurality of computing resources and unavailable computing resources from the plurality of computing resources, allocating the available computing resources for the garbage collection process based on the usage information, and executing the garbage collection process using the allocated available computing resources. The plurality of resources may be shared to perform the operations on the plurality of tuples and to perform the garbage collection process.

In some examples, the garbage collection process includes dynamically increasing a number of computing resources allocated for the garbage collection process based on the usage information and executing the garbage collection process using the increased number of computing resources allocated for the garbage collection process. The garbage collection process may include constraining a rate of assigning available transaction IDs. Optionally, the garbage collection process may include prohibiting any assignment of transaction IDs based on subsequently received queries. In some implementations, the plurality of computing resources are further configured to perform the garbage collection process.

Determining that the oldest transaction ID age satisfies the threshold may include determining that the oldest transaction ID age satisfies a respective threshold from among a plurality of thresholds. In some examples, each respective transaction ID in the set of transaction IDs includes a corresponding ID value. In these examples, determining the oldest transaction ID age from the set of available transaction IDs may include determining a difference between the corresponding ID value of a subsequent available transaction ID after the one of the available transaction IDs and the corresponding ID value of an unavailable transaction ID having a lowest corresponding ID value. In some implementations, the operations further include identifying a respective one of the tuples of the plurality of tuples that includes a collection blocker preventing the garbage collection process from executing on the respective one of the tuples and generating a warning based on identifying the respective one of the tuples of the plurality of tuples that includes the collection blocker.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
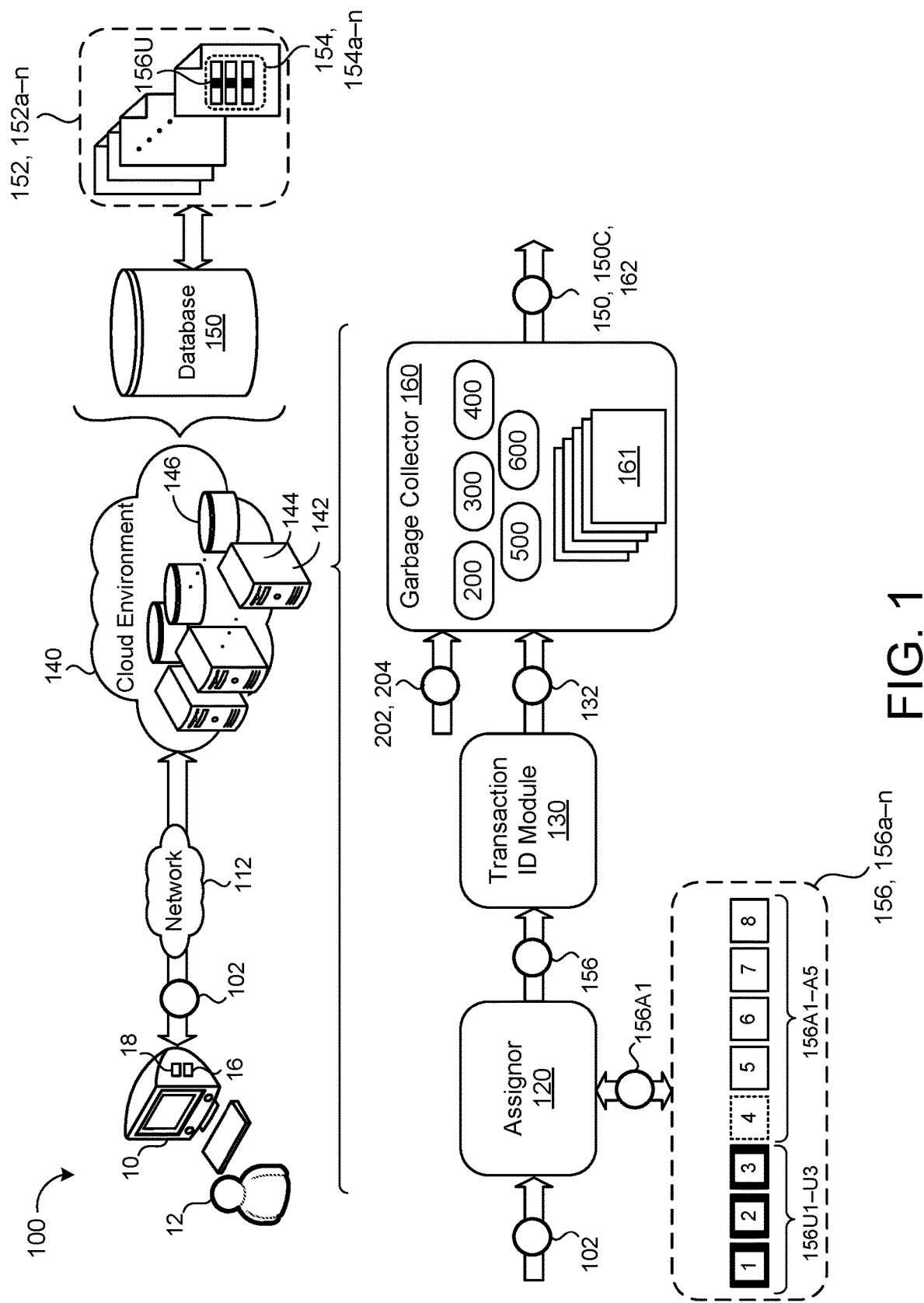
FIG. 1 is a schematic view of an example system performing an adaptive automatic garbage collection process on a database.

Multi-version concurrency control (MVCC) database systems are implemented in most online transaction processing (OLTP) environments. These database systems store a plurality of tuples (e.g., data records) with each tuple having multiple versions. Over time, the databases accumulate a significant number of dead tuples, for example, old versions of a tuple that are no longer used by any transaction. The accumulation of these dead tuples causes table bloat (i.e., accumulation of unused tuple versions) which results in reduced query performance at the database systems. Moreover, the databases assign identifiers in order to track a history of database operations performed on each tuple and track the multiple versions of each tuple. After all of the identifiers are assigned to a tuple, a wrap-around failure occurs where identifiers may be re-assigned to new tuples causing potential system downtime or even catastrophic data losses.

Accordingly, many database systems use background processes to freeze older identifiers and perform a garbage collection process to reclaim dead tuple space to prevent wrap-around failures and reduce table bloat. However, the garbage collection process uses the same computing resources to perform garbage collection as the database systems use to perform database operations for the tuples. Thus, when configuring the garbage collection process a trade-off occurs between allocating enough computing resources to prevent wrap-around failures and tables bloat and not allocating too many resources such that the database is starved of computing resources to perform database operations. However, as customer workloads (e.g., read and write operations at the database) vary, so does the amount of computing resources available to perform the garbage collection processes. Currently, administrators of the database systems define a number of flags to identify dead tuples using a fixed number of computing resources allocated for the garbage collection process. Defining the flags and allocating an appropriate number of computing resources for garbage collection is challenging even for experienced database administrators because customer workload varies. For example, the administrator allocates the fixed number computing resources to perform garbage collection (e.g., 10%). In these examples, however, using 10% of the resources may starve the database system of resources to perform database operations on the tuples when customer workload is high. Alternatively, when the database system experiences a low customer workload, a majority of the resources (e.g., 90%) may be idle while the garbage collection still only uses the fixed 10% of the resources.

Accordingly, implementations herein are directed towards methods and systems for performing an adaptive garbage collection process based on a workload of a database. That is, the adaptive and/or dynamic garbage collection process monitors real-time statistics of the database (e.g., customer workload) to better utilize system resources when performing the garbage collection process. In particular, the method may include obtaining a query to perform a database operation on a tuple stored at a database. Here, the database includes a plurality of computing resources that are shared to both perform database operations and perform the garbage collection process. Each respective tuple is assigned a transaction identifier (ID) from a set of transaction IDs including a subset of unavailable transaction IDs, each currently assigned to a tuple, and a subset of available transaction IDs, each currently unassigned to any tuple. Here, each tuple may include multiple versions where each tuple version is assigned a respective one of the transactions. Thus, each transaction ID represents a single operation or transaction (e.g., tuple version) performed on the respective tuple. The method also includes assigning one of the available transaction IDs to the tuple and determining an oldest transaction ID age from the set of transaction IDs. Based on determining that the oldest transaction ID age from the set of transaction IDs satisfies a threshold, the method performs a garbage collection process on the database. In particular, the method allocates computing resources to the garbage collection process based on customer workload at the database. As used herein, customer workload refers to an amount of computing resources used to perform database operations at the database based on received queries. Notably, customer workload does not include computing resources used in the garbage collection process. As will become apparent the threshold may include a plurality of thresholds whereby in response to each threshold being satisfied, the method allocates more or less computing resources for the garbage collection process.

Referring to FIG. 1, in some implementations, an example system 100 includes a user device 10 associated with a respective user 12 in communication with a cloud computing environment (e.g., remote system) 140 via a network 112. The user device 10 may correspond to any computing device, such as a desktop workstation, a laptop workstation, or a mobile device (i.e., a smart phone). The user device 10 includes computing resources 16 (e.g., data processing hardware) and/or storage resources 18 (e.g., memory hardware).

The cloud computing environment 140 may be a single computer, multiple computers, or a distributed system having scalable/elastic resources 142 including computing resources 144 (e.g., data processing hardware) and/or storage resources 146 (e.g., memory hardware). A database 150 or multiple databases 150 may be overlain on the storage resources 146 to allow scalable use of the storage resources 146 by one or more of the user or computing resources 144. The database 150 may be a multi-version concurrency control (MVCC) database implemented for an online transaction processing (OLTP) environment. The database 150 may be configured to store a plurality of tables 152, 152a-n each having a plurality of tuples 154, 154a-n. Here, each respective tuple 154 may correspond to a row (e.g., data record) for a respective one of the tables 152. Moreover, each respective tuple 154 may include multiple versions of the respective tuple 154. For instance, updating data for a tuple 154 creates a new version of the tuple 154 such that the previous version of the tuple 154 is now a dead tuple version that may be no longer used by any transaction. Thus, the dead tuple version may be removed from the database 150 to reduce table bloat.

Moreover, each respective tuple 154 is assigned a respective transaction identifier (ID) 156 from a set of transaction IDs 156, 156a-n. The transaction identifier 156 is associated with an operation performed on the respective tuple 154. Thus, the transaction ID 156 may be used to identify a tuple version of the tuple 154. In some examples, each respective tuple 154 is assigned a plurality of different transaction IDs 156 each associated with a corresponding operation performed on the respective tuple 154. For example, a first transaction ID 156 (e.g., a minimum transaction ID) may be associated with an initial operation (e.g., a create operation) performed initially create a respective tuple 154 and a subsequent transaction ID 156 (e.g., a maximum transaction ID) may be associated with a most recent operation performed on the respective tuple 154. For instance, the maximum transaction ID 156 may be associated with a most recent edit operation performed to update data of the respective tuple 154 after initially creating the respective tuple 154. Moreover, any number of other transaction IDs 156 may be assigned to the respective tuple 154 after initially creating the respective tuple 154 and before performing the most recent operation on the respective tuple 154. The operations performed on the tuples 154 may include, but are not limited to, read operations, write operations, and/or delete operations.

The set of transaction IDs 156 includes a finite or limited number of transaction IDs 156. In the example shown, the set of transaction IDs 156 only includes eight (8) transaction IDs 156 for the sake of clarity only. However, it is understood that the set of transaction IDs 156 may include any number of transaction IDs 156 including hundreds, thousands, millions, or even billions or more of transaction IDs 156. In some examples, the set of transaction IDs 156 may include a range of contiguous ID values, for example, a 32 bit integer or a 64 bit integer range of ID values, whereby each respective transaction ID 156 corresponds to a respective ID value from the range of contiguous values. Notably, in configurations where the range of contiguous ID values includes the 64 bit integer range of ID values, wrap-around failures are much less likely to occur. In these configurations, however, allocating resources for garbage collection still needs to be tailored based on customer workload and/or an oldest transaction ID age 132, discussed in more detail below, because if the garbage collection process lags table bloat may occur. In the example shown, each transaction ID 156 in the set of transaction IDs 156 corresponds to a respective ID value from the range of contiguous ID values from one (1) through eight (8). In some examples, the set of transaction IDs 156 includes a subset of unavailable transaction IDs 156, 156U that are each currently assigned to a respective one of the tuples 154 and a subset of available transaction IDs 156, 156A that are each currently unassigned to any one of the tuples 154.

In some scenarios, every transaction ID 156 in the set of transaction IDs 156 is assigned to one of the tuples 154. For instance, even when the set of transaction IDs 156 includes four billion transaction IDs 156, all of the transaction IDs 156 may be assigned to one of the tuples 154 in a period of months. Thus, in these scenarios, the transaction IDs 156 previously assigned to tuples 154 are re-assigned to new tuples 154 because there are no remaining available transaction IDs 156 to assign. As a result, a wrap-around failure occurs causing potential downtime of the database 150 or even potential catastrophic data losses. To that end, the cloud computing environment 140 executes an assignor 120, a transaction ID module 130, and a garbage collector 160 to perform a garbage collection processes 200, 300, 400, 500 to perform garbage collection. Here, garbage collection may refer to removing dead tuple versions and/or updating table 152 statistics. Optionally, garbage collection may also include freezing old transaction IDs 156. Here, freezing old transaction IDs 156 includes identifying a cutoff point from the subset of unavailable transaction IDs 156U. The cutoff point corresponds to a transaction ID 156 assigned to a tuple 154 a threshold time period in the past such that transaction IDs 156 assigned before the cutoff point are no longer used by any transactions or queries 102. Unavailable transaction IDs 156U assigned before the cutoff point are replaced with a special, frozen transaction ID. Thus, after the garbage collection freezes old transaction IDs 156, unavailable transaction IDs 156U assigned before the cutoff point are re-classified as available transaction IDs 156A and the oldest unavailable transaction ID 156U advances. Thus, the unavailable transaction identified IDs 156U reclassified as available transaction IDs 156A may be reused in the future for subsequently received queries 102.

The assignor 120 is configured to obtain or receive queries 102 from the user device 10 via the network 112. The queries 102 request the cloud computing environment 140 to perform a database operation on a respective one of the tuples 154. Operations may include creating, editing, and/or deleting data associated with the tuples 154. The cloud computing environment 140 performs the operations on the tuples 154 using the computing resources 144 of the cloud computing environment 140. Based on receiving the query 102, the assignor 120 obtains the set of transaction IDs 156 (e.g., the subset of unavailable transaction IDs 156U and the subset of available transaction IDs 156A) and assigns a respective one of the available transaction IDs 156A from the subset of available transaction IDs 156A to the tuple 154. In other examples, the assignor 120 increments a previously assigned transaction ID 156 and assigns the tuple 154 the incremented transaction ID 156. Thus, the transaction IDs 156 may be used to track a history of database operations performed on each tuple 154 and/or a version of each tuple 154.

In the example shown, the subset of unavailable transaction IDs 154U includes three (3) unavailable transaction IDs 156U, 156U1-U3 and the subset of available transaction IDs 156A includes five (5) available transaction IDs 156A, 156A1-A5. However, it is understood that each subset of transaction IDs 156 may include any number of transaction IDs 156. Continuing with the example shown, the assignor 120 assigns a first one of the available transaction IDs 156A1 to the tuple 154 of the query 102. Here, the first one of the available transaction IDs 156A1 corresponds to the transaction ID 156 associated with the ID value of four (4) and is denoted by the dotted line box in FIG. 1. Thereafter, the assignor 120 updates the set of transaction IDs 156 by re-classifying the first one of the available transaction IDs 156A1 assigned to the tuple 154 as part of the subset of unavailable transaction IDs 156U. Accordingly, after assigning the first one of the available transaction IDs to 156A1, the subset of available transaction IDs 154A now includes four (4) available transaction IDs 154A (e.g., transaction IDs with the ID values of 1-4) and the subset of unavailable transaction IDs 156U now includes four (4) unavailable transaction IDs 154U (e.g., transaction IDs with the ID values of 5-8). Thus, as the assignor 120 continues to assign available transaction IDs 156A from the subset of available transaction IDs 156A for additional queries 102 received from the user device 10, the number of available transaction IDs 156A in the subset of available transaction IDs 156A decreases. The assignor 120 sends the updated set of transaction IDs 156 to the transaction ID module 130.

In some examples, the transaction ID module 130 is configured to determine a number of available transaction IDs (e.g., transaction ID count) 132 in the subset of available transaction IDs 156A. In other examples, the transaction ID module 130 is configured to determine an oldest transaction ID age (e.g., maximum transaction ID age) 132 from the set of transaction IDs 156. Both the number of available transaction IDs 156A and the oldest transaction ID age 132 indicate whether the garbage collector 160 is lagging behind in performing garbage collection thereby requiring more computing resources 144 to perform garbage collection, and thus, may be used interchangeably herein. In particular, an increase in the oldest transaction ID age 132 indicates that the garbage collector 160 is lagging behind in garbage collection at the database 150.

Continuing with the example shown, the transaction ID module 130 determines the number of available transaction IDs 156A to be four (4) after assigning the first one of the available transaction IDs 156A1. In some implementations, the transaction ID module 130 determines the number of available transaction IDs 156A by identifying or counting a number of the transaction IDs 156 in the subset of available transaction IDs 156A. In other implementations, the transaction ID module 130 determines the oldest transaction ID age 132 by determining a difference between the corresponding ID value of a subsequent available transaction ID 156A after the one of the available transaction IDs 156A1 assigned to the tuple 154 based on the query 102 and the corresponding ID value of an unavailable transaction ID 156U having a lowest corresponding ID value. For instance, in the example shown, the corresponding ID value of the subsequent available transaction ID 156A after the one of available transaction IDs 156A1 assigned to the tuple 154 is '5' and the corresponding ID value of the unavailable transaction ID 156U having the lowest corresponding ID value is '1.' In these implementations, the transaction ID module 130 determines the difference (e.g., oldest transaction ID age) to be '4.' Thus, the transaction ID module 130 may further determine the number of available transaction IDs 156A using the difference (e.g., four) and a total number of transaction IDs in the set of transaction IDs 156 (e.g., eight). Moreover, the garbage collection may process tuples 154 having unavailable transaction IDs 156U up to the cutoff point. Thus, all unavailable transaction IDs 156U assigned before the cutoff point are re-classified as available transaction IDs 156U, and therefore, the corresponding transaction ID 156 at the cutoff point becomes the unavailable transaction ID 156U having the lowest transaction ID value. For instance, the cutoff point may correspond to the transaction ID 156 having the ID value of '1' causing the unavailable transaction ID 156U to be re-classified as one of the available transaction IDs 156A. As such, the transaction ID module 130 now determines the corresponding ID value of the subsequent available transaction ID 156A to be '5' and the corresponding ID value of the unavailable transaction ID 156U having the lowest corresponding ID value to now be '2' (instead of '1'). Thus, the difference is now '3' instead of '4' such that the oldest transaction ID age 132 was reduced based on the garbage collection processing tuples 154 before the cutoff point.

In some examples, the transaction ID module 130 determines the oldest transaction ID age 132 periodically at a fixed interval, for example, every millisecond, second, minute, hour, and/or day. In other examples, the transaction ID module 130 determines the oldest transaction ID age 132 on a per-transaction ID basis. That is, the transaction ID module 130 determines the oldest transaction ID age 132 responsive to the assignor 120 assigning each available transaction ID 156 to one of the tuples 154. Here, the oldest transaction ID age 132 will increase after assigning each available transaction ID 156 to one of the tuples 156. In yet other examples, the transaction ID module 130 determines the oldest transaction ID age 132 after the garbage collector 160 performs garbage collection. Here, after performing garbage collection and reclaiming dead tuple space, the transaction ID module 130 determines that the oldest transaction ID age 132 reduces. The transaction ID module 130 outputs the oldest transaction ID age 132 to the garbage collector 160 to indicate a threshold or a margin until the wrap-around failure occurs and/or an amount of dead tuples stored at the database 150. Thus, the garbage collector 160 performs more or less aggressive garbage collection based on the oldest transaction ID age 132.

Accordingly, the garbage collector 160 is configured to perform garbage collection at the database 150 to reclaim dead tuple space. Described in greater detail with reference to FIG. 2, the garbage collector 160 receives usage information 202 from the cloud computing environment 140 for the plurality of computing resources 144 and allocates computing resources 144 to perform garbage collection based on the number of usage information 202. For instance, the garbage collector 160 may determine that customer workload is low based on the usage information 202 and allocate more computing resources 144 for the garbage collection. Conversely, when customer workload is high, less computing resources 144 are allocated for garbage collection to ensure database operations have sufficient computing resources 144 to perform database operations. In some configurations, allocation of computing resources 144 to the garbage collector 160 is further based on the oldest transaction ID age 132. For instance, when the usage information 202 indicates customer workload is high and the oldest transaction ID age is low, the garbage collector 160 uses less computing resources 144 because the computing resources 144 are needed to perform the customer workload and there is no risk of table bloat and/or wrap-around failures because the oldest transaction ID age 132 is low. On the other hand, when the usage information 202 indicates customer workload is high and the oldest transaction ID age is high, the garbage collector 160 uses more computing resources 144 despite the high customer workload because the risk of table bloat and/or a wrap-around failure is high.

In some implementations, the garbage collector 160 performs garbage collection based on determining whether the oldest transaction ID age 132 satisfies a threshold. In other implementations, the garbage collector 160 obtains a number of dead tuples 204 stored at the database 150 and performs garbage collection responsive to determining the number of dead tuples 204 satisfies a threshold. The threshold for the number of dead tuples 204 may vary for each table 152 stored at the database 150 and depend on the size of each table 152. That is, larger tables 152 may have a smaller threshold (e.g., 7%) while smaller tables have a larger threshold (e.g., 10%) for the number of dead tuples 204. Thus, garbage collection may occur more often for large tables 152 because large tables have a lower threshold as for the number of dead tuples 204 as compared to smaller tables 152. Based on determining that the threshold is satisfied, the garbage collector 150 reclaims dead tuple space to free up additional available transaction IDs 156A and reduce table bloat. Here, dead tuple space refers to tuples 154 old versions of tuples 154 no longer used by any transaction at the database 150 because transactions use newer versions of the tuple 154 instead. Thus, the garbage collector 150 may identify the dead tuples 204 stored at the database 150 and delete the identified dead tuples 154 to reduce table bloat. In yet other implementations, the garbage collector 160 performs garbage collection based on a combination of determining whether the oldest transaction ID age 132 satisfies the threshold and/or determining whether the number of dead tuples 204 satisfies the threshold. Moreover, the garbage collector 150 re-classifies (e.g., unassigns) the one or more unavailable transaction IDs 156U assigned to the dead tuple 154 such that the one or more unavailable transaction IDs 156U become part of the subset of available transaction IDs 156A. As such, by reclaiming dead tuple space the garbage collector 150 maintains the oldest transaction ID age 132 to avoid wrap-around failures and also reduce table bloat.

The garbage collector 150 uses the same computing resources 144 of the cloud computing environment 140 as the database 150 uses for performing database operations based on the queries 102. As such, the garbage collector 160 may consume a significant amount of the computing resources 144 when aggressively reclaiming dead tuple space, and thus, consequently starving the database 150 from available computing resources 144 to perform the database operations. As a result, the cloud computing environment 140 may suffer increased latency in performing the database operations for queries 102. However, while simply limiting the amount of computing resources 144 the garbage collector 160 utilizes to reclaim dead tuple space may solve the increased latency issue, it comes at the expense of possibly not having enough computing resources 144 for the garbage collector 160, leading to potential wrap-around failures and table bloat.

Accordingly, the garbage collector 160 is configured to perform one or more of a plurality of different garbage collection processes 200, 300, 400, 500 based on the oldest transaction ID age 132, as described in greater detail with reference to FIGS. 2-5. That is, when the oldest transaction ID age is relatively high the garbage collector 160 performs a more aggressive garbage collection process using more computing resources 144. On the other hand, when the oldest transaction ID age 132 is relatively lower (e.g., a large margin to the wrap-around failure) the garbage collector 160 performs a less aggressive garbage collection process using less computing resources 144. Thus, the garbage collector 160 may determine which respective threshold 161 from a plurality of thresholds 161 the maximum transaction ID 156 satisfies. In the example shown, the plurality of thresholds 161 include five thresholds 161 (i.e., one threshold 161 per garbage collection process 200, 300, 400, 500). Accordingly, in response to each respective threshold 161 being satisfied, the garbage collector 160 performs a corresponding garbage collection process 200, 300, 400, 500 on the database 150. Notably, each garbage collection process 200, 300, 400, 500 may be allocated a respective number of computing resources 144 based on the oldest transaction ID age 132. As a result, the garbage collector 160 outputs a compacted database 150, 150C for storage at the cloud computing environment 140.

In some implementations, the garbage collector 160 identifies a respective one of the tuples 154 that includes a collection blocker 162 that prevents the garbage collector 160 from performing the garbage collection process on the respective one of the tuples 154. That is, the collection blocker 162 may indicate that an old transaction ID 156 is being prevented from advancing. For instance, the collection blocker 162 may correspond to a transaction ID 156 of a long-running transaction for a tuple 154 that occurs for a time period that satisfies a time period threshold (e.g., days or weeks). Here, the garbage collector 160 is unable to determine if the long-running transaction is a legitimate transaction or a no longer used transaction. In some configurations, the assignor assigns transaction IDs 156 to tuples 154 in a two-stage process including a prepare phase and a commit phase. In these configurations, the assignor 120 assigns transaction IDs in the prepare phase and commits the transaction to the database 150 in the commit phase. Thus, transaction IDs 156 left in the prepare phase are referred to as orphan prepared transactions. Here, the garbage collector may identify transaction IDs 156 that are orphan prepared transactions as collection blockers 162. That is, the garbage collector 160 is unable to determine whether the user 12 plans to commit this transaction later or whether the transaction ID may be reclaimed. As such, the garbage collector 160 generates a warning based on identifying the respective one of the tuples 154 having the collection blocker 162 to notify the user 12. In response, the user 12 may indicate whether the garbage collector 160 should reclaim the tuple space or not.

Figure 2:
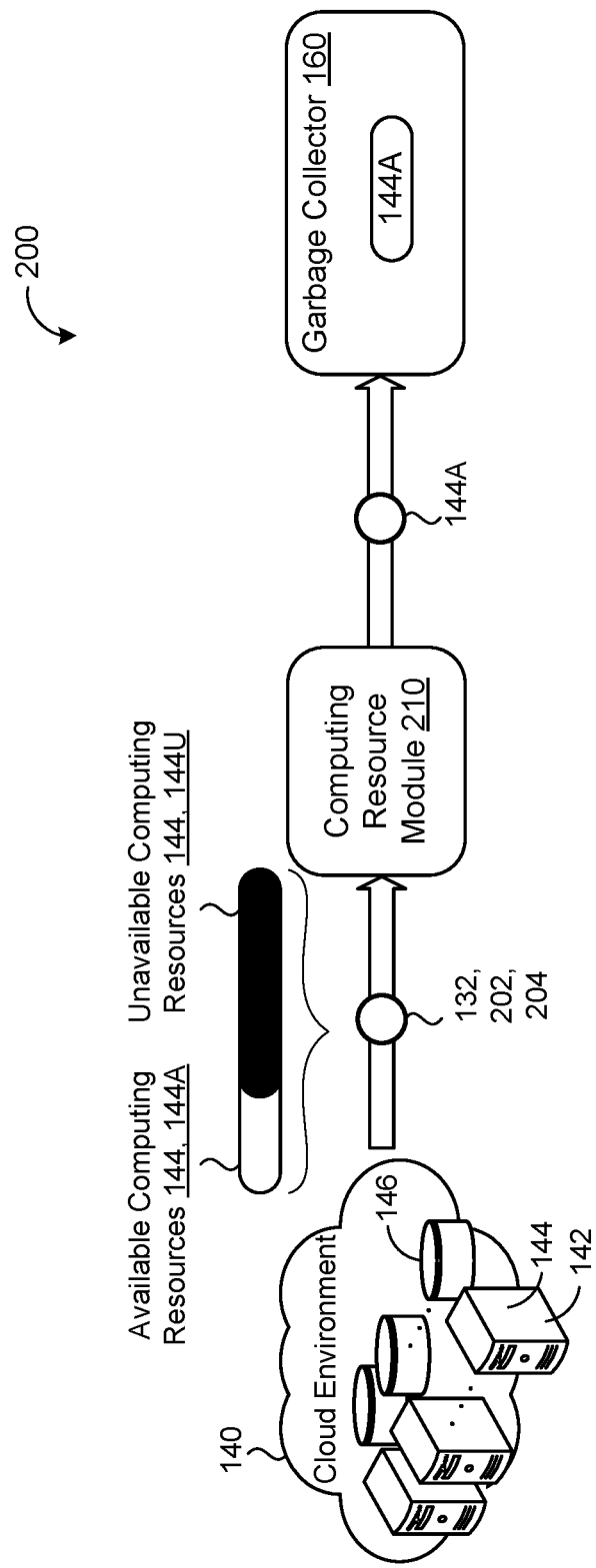
FIG. 2 is a schematic view of an example first garbage collection process.

FIG. 2 illustrates a schematic view of an example first garbage collection process 200 performed by the garbage collector 160 based on determining that the number of available transaction IDs 156A satisfies a first threshold 161 from the plurality of thresholds 161 and/or determining that the number of dead tuples 204 satisfies the threshold. Determining that the number of dead tuples 204 satisfies the threshold may include determining, for each respective table 152 of the plurality of tables 152, whether the number of dead tuples 204 from the respective table 152 satisfies the threshold. That is, each respective table 152 may have a corresponding threshold for the number of dead tuples 204 where the corresponding threshold is based on a size of the respective table 152. For example, the total number of transaction IDs in the set of transaction IDs 156 may include 2 billion transaction IDs 156 where the first threshold corresponds to the number of available transaction IDs 156A being between 90-100% of the total number of transaction IDs or the oldest transaction ID age 132 being less than 200 million. The first garbage collection process 200 includes a computing resource module 210 configured to obtain usage information 202 for the plurality of computing resources 144 and the number of dead tuples 204 from the cloud computing environment 140. As used herein, the usage information 202 refers to real-time central processing unit (CPU) use of computing resources 144 at the cloud computing environment and/or input/output (I/O) use of the computing resources 144 at the cloud computing environment 140. Thus, the usage information 202 indicates the customer workload at the cloud computing environment 140 such that computing resources 144 may be allocated to the garbage collector 160 based on the usage information 202. The number of dead tuples 204 may represent how many dead tuples 204 are stored at the database 150 and/or a ratio of dead tuples to a total number of tuples stored at the database 150. In some examples, the number of dead tuples 204 includes a respective number of dead tuples and/or ratio of dead tuples at each table 152. Thus, one or more tables 152 may have a number of dead tuples 204 that satisfies the threshold, and thus trigger the garbage collection process 200, while other tables 152 have a number of dead tuples 204 that fail to satisfy the threshold.

The plurality of computing resources 144 may include a fixed number of computing resources shared by the cloud computing environment 140 to perform operations for the garbage collection or the database operations. The usage information 202 includes an amount of unavailable computing resources 144, 144U currently performing operations and an amount of available computing resources 144, 144A that are currently idle or not currently performing any operations. The computing resource module 210 allocates the available computing resources 144A (e.g., CPU and/or I/O) to the garbage collector 160 to perform garbage collection based on the usage information 202 and/or the number of dead tuples 204. In some implementations, in response to the oldest transaction ID age 132 satisfying the first threshold 161, the garbage collection process 200 initially allocates a default or baseline number of computing resources 144 to the garbage collector 160 and decrease the number of computing resources 144 allocated to the garbage collector 160 based on the usage information 202. Stated differently, during the garbage collection process 200 the garbage collector 160 may not be allocated more than the default number of computing resources 144 and only reduce (e.g., throttle) the number of computing resources 144 allocated to the garbage collector 160 based on the usage information 202. Thus, based on the real-time statistics received from the usage information 202, the garbage collection process 200 may throttle (or not throttle) the computing resources 144 allocated to the garbage collector 160. In some examples, the allocated available computing resources 144A include all of the available computing resources 144A. In other examples, the allocated available computing resources 144A includes a portion of the available computing resources where a remaining portion of the available computing resources 144 are reserved for future database operations. Using the allocated available computing resources 144A, the garbage collector 160 performs garbage collection on the database 150. The first garbage collection process 200 may adjust the available computing resources 144A allocated to the garbage collector 160 as usage of the computing resources 144 varies with changing customer workloads.

Advantageously, the first garbage collection process 200 executes the garbage collector 160 using the default number of computing resources 144 and then adjusts the number of computing resources 144 allocated to the garbage collector 160 by reducing computing resources 144 from the default number of computing resources 144 allocated to the garbage collector 160 based on the current or real-time usage information 202. As such, when a large number of computing resources 144 are idle, the first garbage collection process 200 executes the garbage collector 160 using the default number of computing resources 144 based on the usage information 202 for the garbage collector 160 to perform garbage collection. Alternatively, when less computing resources 144 are idle (i.e., customer workload is high), the first garbage collection process 200 reduces the computing resources 144 from the default number of computing resources 144 allocated to the garbage collector 160 based on the usage information 202, and thus, does not starve the cloud computing environment 140 from the computing resources 144 to perform database operations. In some scenarios, the number of available computing resources 144A constantly remains low due to a high workload of performing database operations. In these scenarios, the constant low number of available computing resources 144A may cause the first garbage collection process 200 to constantly throttle the computing resources 144 allocated to the garbage collector 160 such that the garbage collector 160 is unable to keep up with the garbage collection and prevent wrap-around failures. Thus, the garbage collector 160 may need to perform more aggressive garbage collection processes responsive to the lag in garbage collection and the oldest transaction ID age 132 satisfying subsequent thresholds 161 from the plurality of thresholds 161 as described with reference to FIGS. 3-5.

Figure 3:
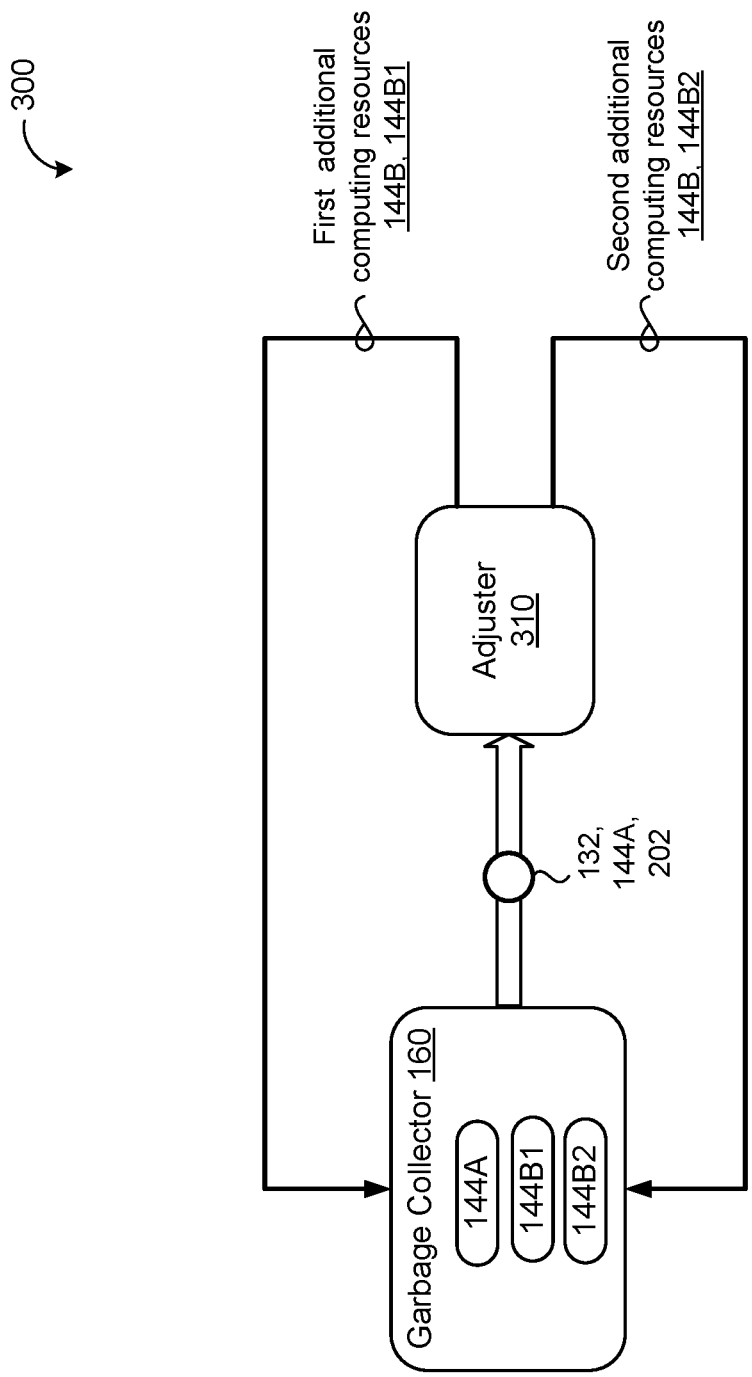
FIG. 3 is a schematic view of an example second garbage collection process.

FIG. 3 illustrates a schematic view of an example second garbage collection process 300 performed by the garbage collector 160 based on determining that the number of available transaction IDs 156A satisfies a second threshold 161 from the plurality of thresholds 161. Continuing with the example above, the second threshold may correspond to the number of available transaction IDs 156A less than the first or second thresholds 161 (e.g., between 20-90% of the total number of transaction IDs or an the oldest transaction ID age 132 being between 200 million and 1.6 billion). The second garbage collection process 300 includes an adjuster 310 configured to dynamically increase a number of computing resources 144 allocated to the garbage collector 160 over time. For instance, the adjuster 310 may receive the available computing resources 144A previously allocated to the garbage collector 160 (e.g., default number of computing resources 144) by the first garbage collection process 200 (FIG. 2). In contrast to the first garbage collection process 200 which simply reduces (below the default number of computing resources 144) the computing resources 144 allocated to the garbage collector 160, the adjuster 310 dynamically increases the number of computing resources 144 (beyond the default number of computing resources 144) allocated to the garbage collector 160. Here, the increased number of computing resources 144 allocated by the second garbage collection process 300 is based on the oldest transaction ID age 132 and/or the usage information 202. That is, as the oldest transaction ID age 132 increases, so does the increased number of computing resources 144 allocated by the second garbage collection process. Conversely, as the oldest transaction ID age 132 decreases, so does the number of computing resources 144 allocated by the second garbage collection process 300.

Moreover, the adjuster 310 receives the oldest transaction ID age 132 and the usage information 202 and increases the number of computing resources 144 allocated to the garbage collector 160 based on the usage information 202. Thus, even though the adjuster 310 may increase the number of computing resources 144 allocated to the garbage collector 160 beyond the default number of computing resources 144, the adjuster 310 still allocates computing resources 144 based on the usage information 202. Accordingly, when the usage information 202 indicates customer workload is low, the adjuster 310 may leverage the idle computing resources 144 and increase the number of computing resources 144 allocated to the garbage collector 160 beyond the default number of computing resources 144 (FIG. 2). On the other hand, when the usage information 202 indicates customer workload is high, the adjuster 310 may continue to execute the garbage collector 160 using the default number of computing resources 144 or even reduce the number of computing resources 144 allocated to the garbage collector 160 below the default number of computing resources 144. As such, the second garbage collection process 300 still aims to avoid starving the cloud computing environment 140 from computing resources 144 to perform database operations based on the usage information 202. In some scenarios, however, because the second garbage collection process 300 executes responsive to the oldest transaction ID age 132 satisfying the second threshold (i.e., indicating the garbage collector 160 is lagging behind in garbage collection), the second garbage collection process 300 allocates computing resources 144 based on usage information 202 thereby causing minimal impact to the customer workload. Simply put, because the second garbage collection process 300 executes when the database 150 is in greater danger of table bloat and/or wrap-around failures the second garbage collection process 300 may allocate computing resources 144 to the garbage collector 160 at the expense of starving the database operations from computing resources 144 such that the garbage collector 160 reduce the oldest transaction ID age 132 to satisfying the first threshold 161. With respect to the second garbage collection process 300, computing resources 144 allocated to the garbage collector 160 may refer to worker processes and/or memory needed by each worker to perform garbage collection.

In some examples, the adjuster 310 increases the number of computing resources 144 allocated to the garbage collector 160 responsive to the oldest transaction ID age 132. Here, the transaction ID module 130 (FIG. 1) may determine the oldest transaction ID age 132 after assigning each transaction ID 156 or at a fixed interval (e.g., millisecond or second). Here, because the second garbage collection process 300 executes responsive to the oldest transaction ID age 132 satisfying the second threshold 161, the adjuster 310 allocates a number of additional computing resources 144, 144B periodically as the transaction ID module 130 continues to output the oldest transaction ID age 132. Thus, the garbage collector 160 executes the second garbage collection process 300 using the increased number of computing resources 144B in addition to any previously allocated computing resources 144A (e.g., default number of computing resources 144). Notably, the adjuster 310 may allocate the number of additional computing resources 144B regardless of whether the computing resources are available or unavailable. As described above, because the second threshold 161 is satisfied the second garbage collection process 300 must take more aggressive measures to avoid the wrap-around failure even if it comes at a cost starving the cloud computing environment 140 of performing database operations while still increasing the number of computing resources 144 based on the usage information 202 to minimize any impact to the customer workload where possible.

In some implementations, the adjuster 310 dynamically allocates the number of additional computing resources 144B to the garbage collector 160 based on the oldest transaction ID age 132 determined by the transaction ID module (FIG. 1). Thus, as the oldest transaction ID age increases, the adjuster 310 allocates more computing resources 144, and as the oldest transaction ID age 132 decreases, the adjuster 310 allocates less computing resources 144. In the example shown, the adjuster 310 dynamically allocates a first number of additional computing resources 144B, 144B1 (e.g., allocate ten additional resources) to the garbage collector 160 based on determining a first oldest transaction ID age 132 (e.g., 200 million) and allocates a second number of additional computing resources 144B, 144B2 (e.g., allocate another ten additional resources) to the garbage collector 160 based on determining a second transaction ID age 132 (e.g., 500 million). The adjuster 310 may continue dynamically adding additional computing resources 144 to the garbage collector 160 as the oldest transaction ID age 132 increases or decreases. Thus, the amount of computing resources 144 allocated to the garbage collector 160 gradually increases over time (e.g., as the oldest transaction ID age 132 increases) and, conversely, the amount of computing resources 144 available to perform database operations gradually decreases as the oldest transaction ID age 132 increases. Advantageously, by dynamically allocating additional computing resources to garbage collector 160, the adjuster 310 prevents an abrupt wrap-around failure or severe table bloat whereby the cloud computing environment 140 no longer performs database operations until the wrap-around failure or table bloat is corrected. Here, correcting the wrap-around failure after it occurs may take several days causing significant downtime of the database 150.

As the adjuster 310 dynamically increases the number of computing resources 144 allocated to the garbage collector 160 based on the usage information 202, the garbage collector 160, using the increased number of computing resources 144, is able to remove more dead tuples thereby reducing the oldest transaction ID age 132. Thus, as the maximum ID age 132 reduces, the adjuster 310 dynamically allocates less computing resources 144 to the garbage collector 160 based on the usage information 202. Moreover, once the maximum ID age 132 fails to satisfy the second threshold and satisfies the first threshold, the garbage collector 160 returns to executing using the first garbage collection process 200 that throttles the number of computing resources 144 allocated to the garbage collector 160 based on the usage information 202.

Figure 4:
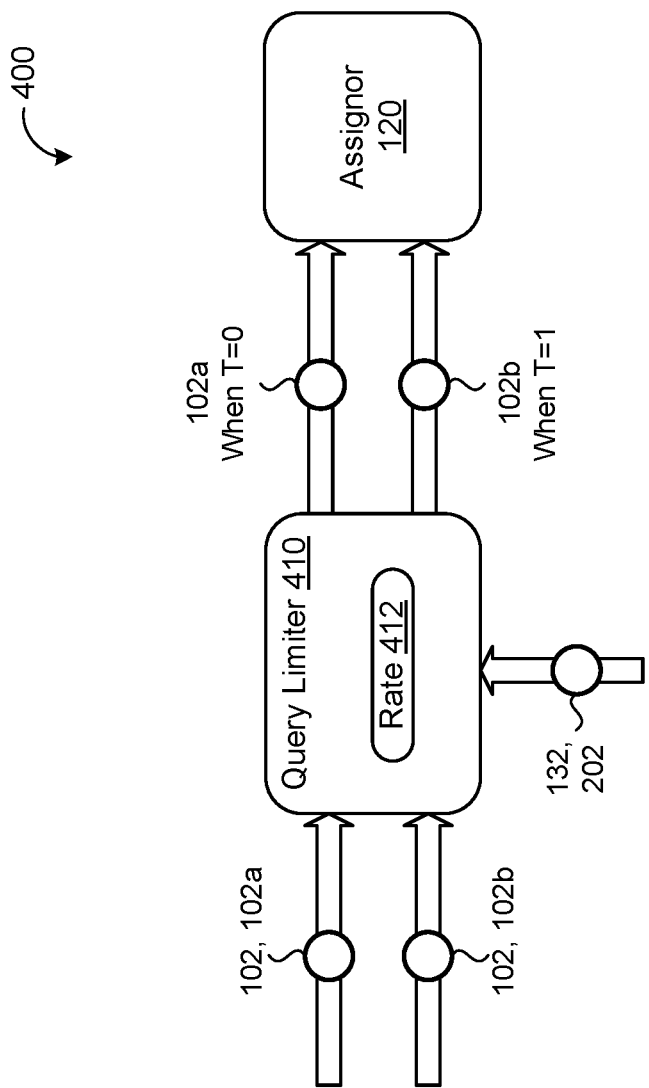
FIG. 4 is a schematic view of an example third garbage collection process.

FIG. 4 illustrates a schematic view of an example third garbage collection process 400 performed by the garbage collector 160 based on determining that the number of available transaction IDs 156A satisfies the third threshold 161 of the plurality of thresholds 161. Continuing with the above example, third threshold may correspond to the number of available transaction IDs 156A less than the first and second thresholds 161 (e.g., between 0.075-20% of the total number of transaction IDs or the oldest transaction ID age 132 being between 1.6 billion and 1.9985 billion). The third garbage collection process 400 includes a query limiter 410 implemented upstream from the assignor 120. That is, the third garbage collection process 400 may direct the queries 102 to the query limiter 410 instead of the assignor 120. As such, the query limiter 410 may be configured to receive the queries 102, as input, and limit or constrain a rate 412 of assigning available transaction IDs 156A to tuples 154 based on received queries 102. In particular, the query limiter 410 may also receive the oldest transaction ID age 132 and the usage information 202 determine the rate 412 based on the oldest transaction ID age 132 and/or the usage information 202. Thus, the query limiter 410 may determine a rate 412 of assigning transaction IDs 156 to tuples 154 and only send queries 102 to the assignor 120 according to the determined rate 412.

In the example shown the query limiter 410 determines a rate 412 of one query 102 per second and receives two queries 102a and 102b simultaneously. In this example, the query limiter 410 forwards one of the two queries 102 (e.g., query 102a) immediately when T=0, and then waits one second when T=1 to forward the second of the two queries (e.g., query 102b). Thus, by forwarding the queries 102 to the assignor 120 according to the determined rate 412, the query limiter 410 limits how quickly the assignor 120 assigns transaction IDs 156 to tuples 154 based on queries 102. In some implementations, the query limiter 410 determines the rate 412 based on the oldest transaction ID age 132. That is, as the oldest transaction ID age 132 increases, the determined rate 412 decreases, and as the oldest transaction ID age 132 decreases, the determined rate 412 increases. As the query limiter 410 limits queries 102 according to the determined rate 412, the oldest transaction ID age 132 decreases as garbage collection occurs. Thus, the garbage collector 160 may determine that the oldest transaction ID age 132 no longer satisfies the third threshold 161 such that the garbage collector 160 returns to performing the first garbage collection process 200 (FIG. 2) or the second garbage collection process 300 (FIG. 3).

Figure 5:
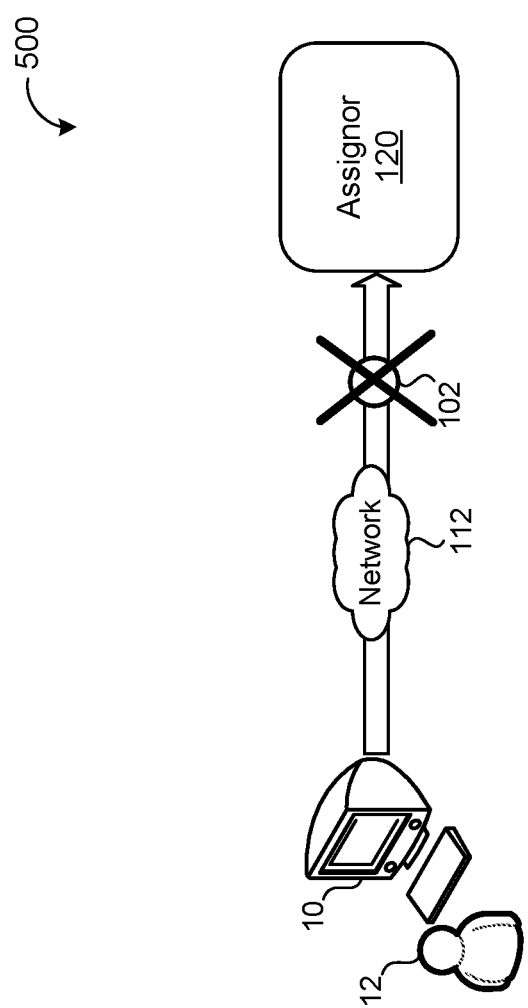
FIG. 5 is a schematic view of an example fourth garbage collection process.

FIG. 5 illustrates a schematic view of an example fourth garbage collection process 500 performed by the garbage collector 160 based on determining that the number of available transaction IDs satisfies a fourth threshold 161 from the plurality of thresholds 161. Again, continuing with the above example, the fourth threshold may correspond to the number of available transaction IDs 156A less than the first, second, or third thresholds 161 (e.g., between less than 0.075% of the total number of transaction IDs or the oldest transaction ID age 132 being greater than 1.9985 billion). Thus, the fourth garbage collection process 500 determines that a wrap-around failure may be imminent, and thus, prohibits assigning any transaction IDs 156 based on any subsequently received queries 102. In particular, the fourth garbage collection process 500 prohibits assigning any more transaction IDs 156 by rejecting any subsequent queries received from the user 12, via the user device 10, over the network 112 before the assignor 120 receives the queries 102 as depicted by the "X" in FIG. 5. Moreover, based on rejecting subsequent queries 102, the fourth garbage collection process 500 generates (i.e., throws) errors and notifies the user 12 of the generated errors.

In some implementations, the garbage collection processes described in FIGS. 2-5 may each be performed by the garbage collector 160 independently from one another. In other implementations, the garbage collection processes build on one another. For instance, the fourth garbage collection process 500 may include the operations performed by the fourth, third, second, and first garbage collection processes also. As such, each garbage collection process 500 may consume a different number of computing resources 144 to perform garbage collection. However, the garbage collector 160 may perform any combination of garbage collection processes in response to determining that any one of the respective thresholds is satisfied. A major advantage of applying the different garbage collection processes is that the garbage collector 160 does not consume any (or very few) computing resources 144 when the database 150 requires most of the computing resources 144 for database operations. However, by determining which particular threshold from among the plurality of thresholds the number of available transaction IDs 156A satisfies, the garbage collector 160 consumes an appropriate number of computing resources 144 to perform garbage collection at the database 150.

Figure 6:
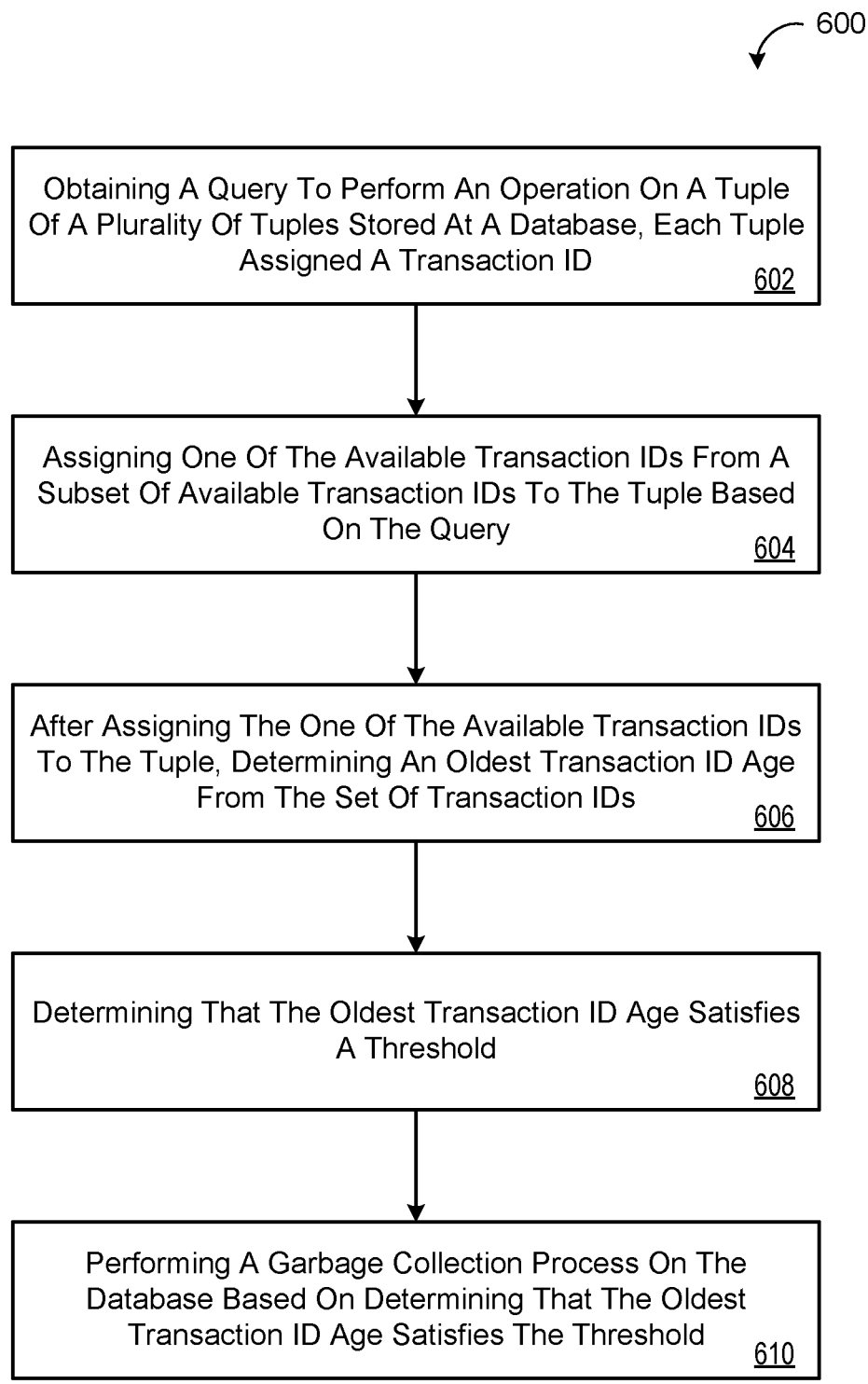
FIG. 6 is a flowchart of an example arrangement of operations for a method of performing the adaptive automatic garbage collection process.

FIG. 6 is a flowchart of an exemplary arrangement of operations for a computer-implemented method 600 for performing an adaptive automatic garbage collection process. Data processing hardware 710 (FIG. 7) may execute instructions stored on memory hardware 720 (FIG. 7) that causes the data processing hardware 710 to perform operations for the method 600. The data processing hardware 710 may include the data processing hardware 16 of the user device 10 or computing resources 144 (e.g., data processing hardware) residing on the cloud computing environment 140. The memory hardware 720 may include the memory hardware 18 of the user device 10 or the memory hardware 146 residing on the cloud computing environment 140.

At operation 602, the method 600 includes obtaining a query 102 to perform an operation on a tuple 154 of a plurality of tuples 154 stored at a database 150. The database 150 includes a plurality of computing resources 144 configured to perform operations on the plurality of tuples 154 and perform a garbage collection process. Each respective tuple 154 of the plurality of tuples 154 assigned a respective transaction ID 156 from a set of transaction IDs 156. The set of transaction IDs 156 including a subset of unavailable transaction IDs 156, 156U each currently assigned to one of the tuples 154 of the plurality of tuples 154 and a subset of available transaction IDs 156, 156A each currently unassigned to any tuple 154 of the plurality of tuples 154. At operation 604, the method 600 includes assigning one of the available transaction IDs 156A (e.g., a first one of the available transaction IDs 156A1) to the tuple 154 based on the query 102. At operation 606, the method 600 includes determining an oldest transaction ID age 132 from the set of transaction IDs 156. At operation 608, the method 600 includes determining that the oldest transaction ID age 132 satisfies a threshold. In particular the method 600 may determine that the oldest transaction ID age 132 satisfies a respective threshold from among a plurality of thresholds. At operation 610, the method 600 includes performing a garbage collection process on the database 150 based on determining that the oldest transaction ID age 132 satisfies the threshold. More specifically, the method 600 may perform a corresponding garbage collection process 200, 300, 400, 500 based on the respective one of the thresholds satisfied by the oldest transaction ID age 132.

Figure 7:
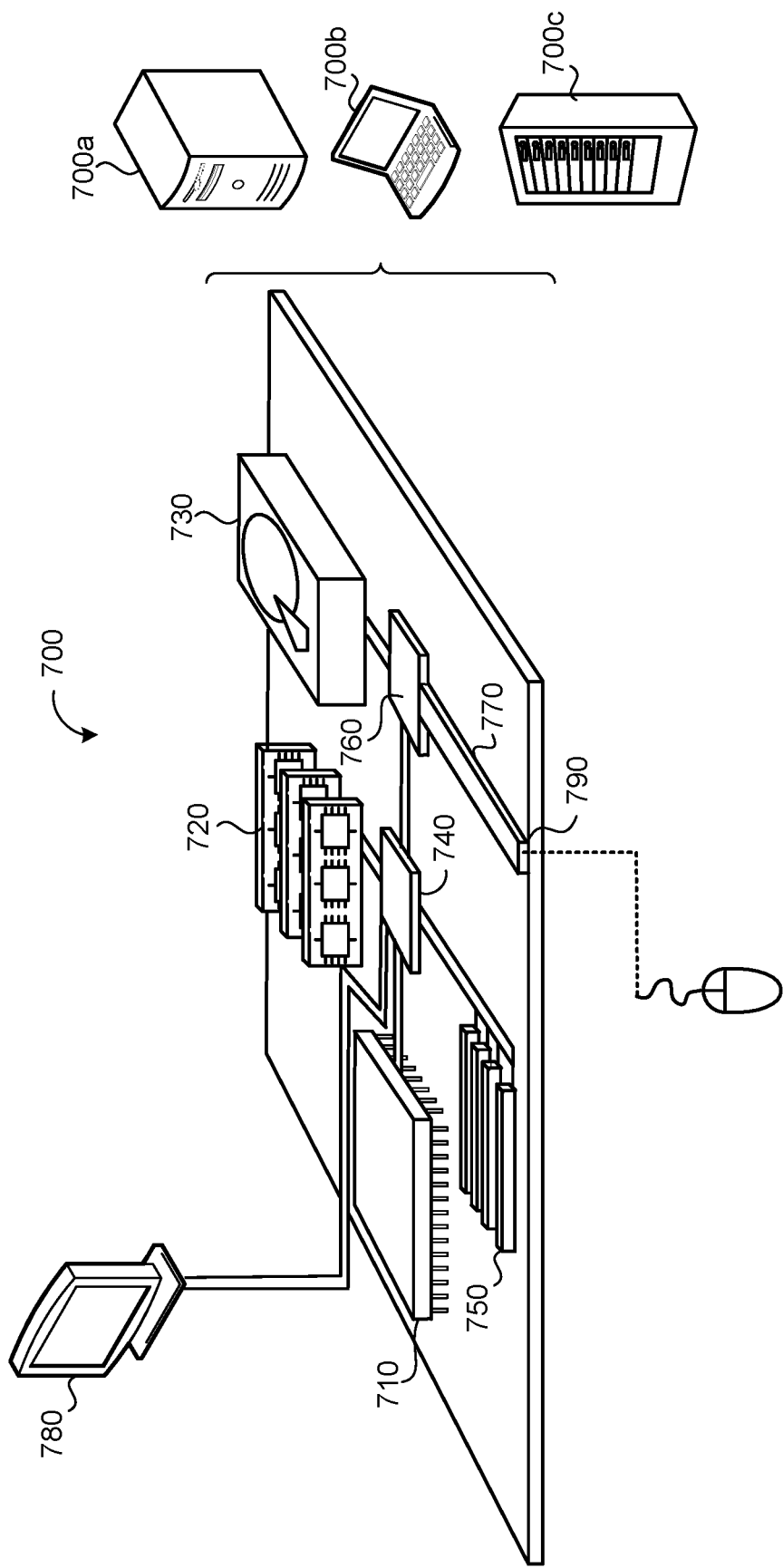
FIG. 7 is a schematic view of an example computing device that may be used to implement the systems and methods described herein.

FIG. 7 is a schematic view of an example computing device 700 that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 710, memory 720, a storage device 730, a high-speed interface/controller 740 connecting to the memory 720 and high-speed expansion ports 750, and a low speed interface/controller 760 connecting to a low speed bus 770 and a storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and a low-speed expansion port 790. The low-speed expansion port 790, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700*a* or multiple times in a group of such servers 700*a*, as a laptop computer 700*b*, or as part of a rack server system 700*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   receiving, by data processing hardware, a set of queries including a first subset of queries and a second subset of queries, each query from the set of queries indicating an operation to perform on a respective tuple of a plurality of tuples stored at a database, the data processing hardware comprising a plurality of computing resources configured to perform operations on the plurality of tuples, each tuple from the plurality of tuples assigned a respective transaction identifier (ID) from a set of transaction IDs, the set of transaction IDs including:
      a subset of unavailable transaction IDs each currently assigned to one of the tuples from the plurality of tuples; and
      a subset of available transaction IDs each currently unassigned to any tuple from the plurality of tuples;
   executing, by the data processing hardware, the first subset of queries by at least assigning, at a first transaction ID assignment rate and for each query from the first subset of queries, a respective first available transaction ID from the subset of available transaction IDs to a respective first one or more tuples from the plurality of tuples;
   determining, by the data processing hardware, an oldest transaction ID age from the set of transaction IDs;
   determining, by the data processing hardware and responsive to the oldest transaction ID age satisfying a first age threshold, a second transaction ID assignment rate different than the first transaction ID assignment rate;
   executing, by the data processing hardware, the second subset of queries by at least assigning, at the second transaction ID assignment rate and for each query from the second subset of queries, a respective second available transaction ID from the subset of available transaction IDs to a respective second one or more tuples from the plurality of tuples; and
   performing, by the data processing hardware and responsive to the oldest transaction ID age satisfying a second age threshold, a garbage collection process on the database.

2. The computer-implemented method of claim 1, wherein the garbage collection process comprises:
   obtaining, by the data processing hardware, usage information for the plurality of computing resources, the usage information including available computing resources from the plurality of computing resources and unavailable computing resources from the plurality of computing resources;
   allocating, by the data processing hardware, the available computing resources for the garbage collection process based on the usage information; and
   executing, by the data processing hardware, the garbage collection process using the allocated available computing resources.

3. The computer-implemented method of claim 2, wherein the plurality of resources are shared to perform the operations on the plurality of tuples and to perform the garbage collection process.

4. The computer-implemented method of claim 2, wherein the garbage collection process comprises:
   dynamically increasing, by the data processing hardware, a number of computing resources allocated for the garbage collection process based on the usage information; and
   executing, by the data processing hardware, the garbage collection process using the increased number of computing resources allocated for the garbage collection process.

5. The computer-implemented method of claim 1, wherein the garbage collection process comprises constraining, by the data processing hardware, the second transaction ID assignment rate.

6. The computer-implemented method of claim 1, wherein the garbage collection process comprises prohibiting, by the data processing hardware, any assignment of transaction IDs based on subsequently received queries.

7. The computer-implemented method of claim 1, wherein the plurality of computing resources are further configured to perform the garbage collection process.

8. The computer-implemented method of claim 1, wherein each respective transaction ID in the set of transaction IDs comprises a corresponding ID value.

9. The computer-implemented method of claim 8, wherein determining the oldest transaction ID age from the set of transaction IDs comprises determining, by the data processing hardware, a difference between the corresponding ID value of a subsequent available transaction ID after the one of the available transaction IDS and the corresponding ID value of an unavailable transaction ID having a lowest corresponding ID value.

10. The computer-implemented method of claim 8, further comprising:

identifying a respective one of the plurality of tuples comprising a collection blocker preventing the garbage collection process from executing on the respective one of the plurality of tuples; and generating a warning based on identifying the respective one of the plurality of tuples comprising the collection blocker.

11. The computer-implemented method of claim 1, further comprising:

obtaining, by the data processing hardware, usage information for the plurality of computing resources, the usage information including available computing resources from the plurality of computing resources and unavailable computing resources from the plurality of computing resources, wherein determining the second transaction ID assignment rate is based on the usage information.

12. The computer-implemented method of claim 11, wherein determining the second transaction ID assignment rate is based on the oldest transaction ID age.

13. A computing system comprising:

data processing hardware; and memory hardware in communication with the data processing hardware, the memory hardware storing instructions that when executed on the data processing hardware cause the data processing hardware to:

receive a set of queries including a first subset of queries and a second subset of queries, each query from the set of queries indicating an operation to perform on a respective tuple of a plurality of tuples stored at a database, the data processing hardware comprising a plurality of computing resources configured to perform operations on the plurality of tuples, each tuple from the plurality of tuples assigned a respective transaction identifier (ID) from a set of transaction IDs, the set of transaction IDs including:

a subset of unavailable transaction IDs each currently assigned to one of
the tuples from the plurality of tuples; and
a subset of available transaction IDs each currently unassigned to any tuple from the plurality of tuples;

execute the first subset of queries by at least assigning, at a first transaction ID assignment rate and for each query from the first subset of queries, a respective first available transaction ID from the subset of available transaction IDs to a respective first one or more tuples from the plurality of tuples;

determine an oldest transaction ID age from the set of transaction IDs;

determine, responsive to the oldest transaction ID age satisfying a first age threshold, a second transaction ID assignment rate different than the first transaction ID assignment rate;

execute the second subset of queries by at least assigning, at the second transaction ID assignment rate and for each query from the second subset of queries, a respective second available transaction ID from the subset of available transaction IDs to a respective second one or more tuples from the plurality of tuples; and perform, responsive to the oldest transaction ID age satisfying a second age threshold, a garbage collection process on the database.

14. The computing system of claim 13, wherein the garbage collection process comprises:

obtaining usage information for the plurality of computing resources, the usage information including available commuting resources from the plurality of computing resources and unavailable resources from the plurality of computing resources;

allocating the available computing resources for the garbage collection process based on the usage information; and executing the garbage collection process using the allocated available computing resources.

15. The computing system of claim 14, wherein the plurality of resources are shared to perform the operations on the plurality of tuples and to perform the garbage collection process.

16. The computing system of claim 14, wherein the garbage collection process comprises:

dynamically increasing a number of computing resources allocated for the garbage collection process based on the usage information; and executing the garbage collection process using the increased number of computing resources allocated for the garbage collection process.

17. The computing system of claim 13, wherein the garbage collection process comprises constraining the second transaction ID assignment rate.

18. The computing system of claim 13, wherein the garbage collection process comprises prohibiting any assignment of transaction IDs based on subsequently received queries.

19. The computing system of claim 13, wherein the plurality of computing resources are further configured to perform the garbage collection process.

20. The computing system of claim 13, wherein each respective transaction ID in the set of transaction IDs comprises a corresponding ID value.

21. The computing system of claim 20, wherein determining the oldest transaction ID age from the set of transaction IDs comprises determining a difference between the corresponding ID value of a subsequent available transaction ID after the one of the available transaction IDs and the corresponding ID value of an unavailable transaction ID having a lowest corresponding ID value.

22. The computing system of claim 13, wherein the memory hardware further causes the data processing hardware to:

identify a respective one of the plurality of tuples comprising a collection blocker preventing the garbage collection process from executing on the respective one of the plurality of tuples; and generate a warning based on identifying the respective one of the plurality of tuples comprising the collection blocker.

* * * * *